United States Patent

Ruehrwein et al.

Patent Number: 6,092,671
Date of Patent: Jul. 25, 2000

[54] LIQUID CLARIFICATION TANK

[75] Inventors: Donald N. Ruehrwein, Batavia; David K. Wyness, Springfiled; Daniel H. Phillips, Hinckley, all of Ill.

[73] Assignee: Chicago Bridge and Iron Company, Plainfield, Ill.

[21] Appl. No.: 09/165,939

[22] Filed: Oct. 2, 1998

[51] Int. Cl.[7] .................................. B01D 21/02
[52] U.S. Cl. ................ 210/519; 210/521; 210/532.1; 210/540
[58] Field of Search ..................... 210/519, 521, 210/528, 532.1, 538, 540

[56] References Cited

U.S. PATENT DOCUMENTS

| | | | |
|---|---|---|---|
| 2,779,733 | 1/1957 | Kalinske | 210/521 |
| 3,314,547 | 4/1967 | Kivell | 210/528 |
| 3,615,025 | 10/1971 | Rice et al. | 210/521 |
| 4,303,517 | 12/1981 | Love et al. | 210/521 |
| 4,871,459 | 10/1989 | Tifoff | 210/521 |
| 4,983,294 | 1/1991 | Lamb | 210/532.1 |
| 4,983,295 | 1/1991 | Lamb et al. | 210/521 |
| 5,340,485 | 8/1994 | Bradley et al. | 210/528 |

*Primary Examiner*—Christopher Upton
*Attorney, Agent, or Firm*—Marshall, O'Toole, Gerstein, Murray & Borun

[57] ABSTRACT

An upflow liquid clarifier for treating a liquid that contains dissolved or suspended solids has a lower chamber with an annular shape, an inner wall extending upwardly and inwardly from that lower chamber, and an outer wall that extends upwardly and outwardly from the lower chamber. Inlets in communication with the lower chamber provide entry for liquid, which rises in a helical motion through the clarifier. Motion of the water establishes a sludge blanket, through which clarified water rises and can be removed from near the top of the clarifier. A sludge removal structure allows the continuous or periodic removal of sludge.

15 Claims, 8 Drawing Sheets

LIQUID CLARIFICATION TANK

This invention relates generally to apparatus for treating liquids to remove dissolved or suspended solids, such as for treating water to clarify it for potable or industrial use, or for treating wastewater, and more particularly to clarifiers in which the liquid flows in an upward helical path, gradually decreasing in velocity until precipitated or suspended solids separate from the rising water to create a rotating sludge blanket beneath a region of clarified water.

BACKGROUND OF THE INVENTION

An upflow water clarifier, such as those disclosed in Wyness U.S. Pat. Nos. 4,146,471 and 4,765,891, is a type of clarifier that has a prominent conical portion extending upwardly and outwardly from a central lower cylindrical end. Contaminated water enters the clarifier near the lower end. Inside, the water is given a rotational movement, often in part by feeding it into the clarifier in a tangential direction, resulting in a generally upward helical flow of the water within the clarifier.

The increasing diameter of the clarifier toward its upper end causes a decrease in velocity of the liquid as it moves upwardly. As the velocity decreases, suspended solids having a higher density than water agglomerate and separate from the water, forming a revolving sludge blanket that remains behind as clarified water continues moving upwardly until being withdrawn as clarified effluent.

Conventionally, the effluent is removed from the clarifier over weirs or troughs, while sludge is periodically removed through a sludge concentrator, which is typically located on the central axis of the clarifier, but which can alternatively be provided off of the central axis or even outside of the vessel, immediately adjacent the vessel wall.

One problem with upflow clarifiers is a limitation in the maximum practical size. In order to handle large flow rates, upflow clarifiers can become undesirably tall, leading to difficulties in maintaining structural stability and in fitting into an existing hydraulic profile. If the top of the clarifier is to be at ground level, more difficult and expensive excavation is needed; if the base of the clarifier is to be at ground level, more energy is needed to pump the liquid through the clarifier. Aesthetic concerns may also be a significant problem.

Use of multiple smaller vessels is often not a good solution. Multiple smaller vessels may be more expensive and may require more land than is readily available, and can also create piping and valving problems.

SUMMARY OF THE INVENTION

The applicants have developed a new shape for an upflow clarifier that allows for the clarifier to handle a proportionally greater flowrate of liquid without becoming excessively tall. This results in a clarifier that can fit into a tighter hydraulic profile, allowing greater stability and requiring less pumping energy and less excavation. The more efficient size can also reduce the number of vessels required on a site, reducing the expense and the overall land requirements as well as piping and valving requirements.

Instead of a conventional circular lower chamber for receiving the liquid to be clarified, the claimed design includes a lower chamber that has an extended, annular shape. This annular shape may be defined in part by an inside wall on the lower chamber. The claimed design also has an inner wall extending upwardly and inwardly from the lower chamber. The clarifier may include a conventional outer wall extending upwardly and outwardly from the lower chamber, one or more conventional inlets in liquid communication with the lower chamber, a conventional means for withdrawing clarified liquid from near the top of the clarifier, and a conventional sludge removal structure.

In addition to reducing height requirements and improving stability, the design may also offer advantages in easier personnel access to a centrally-disposed sludge removal structure, improved hydraulics resulting in reduced "short-circuiting" of liquid to the outer wall of the clarifier, and greater efficiency in the establishment of rotational movement in the liquid as it enters the lower chamber.

Improved construction efficiencies may also be possible. For example, a modular approach can be used to construct clarifiers of various different sizes. Conceptually, a clarifier can be cut in half by a vertical plane, resulting in a pair of curved sections, and then those halves can be spread apart horizontally and connected by adding a straight section between the curved sections. This allows the capacity of the clarifier to be changed by simply lengthening or shortening the length of the relatively easy-to-fabricate straight section. By enabling the capacity of the clarifier to be changed without requiring any changes in the more complicated curved sections of the clarifier, significant cost savings may be realized.

Further advantages should be apparent to those skilled in the art upon reviewing the following detailed description and accompanying drawings, in which:

DETAILED DESCRIPTION OF THE DRAWINGS

Figure 1:
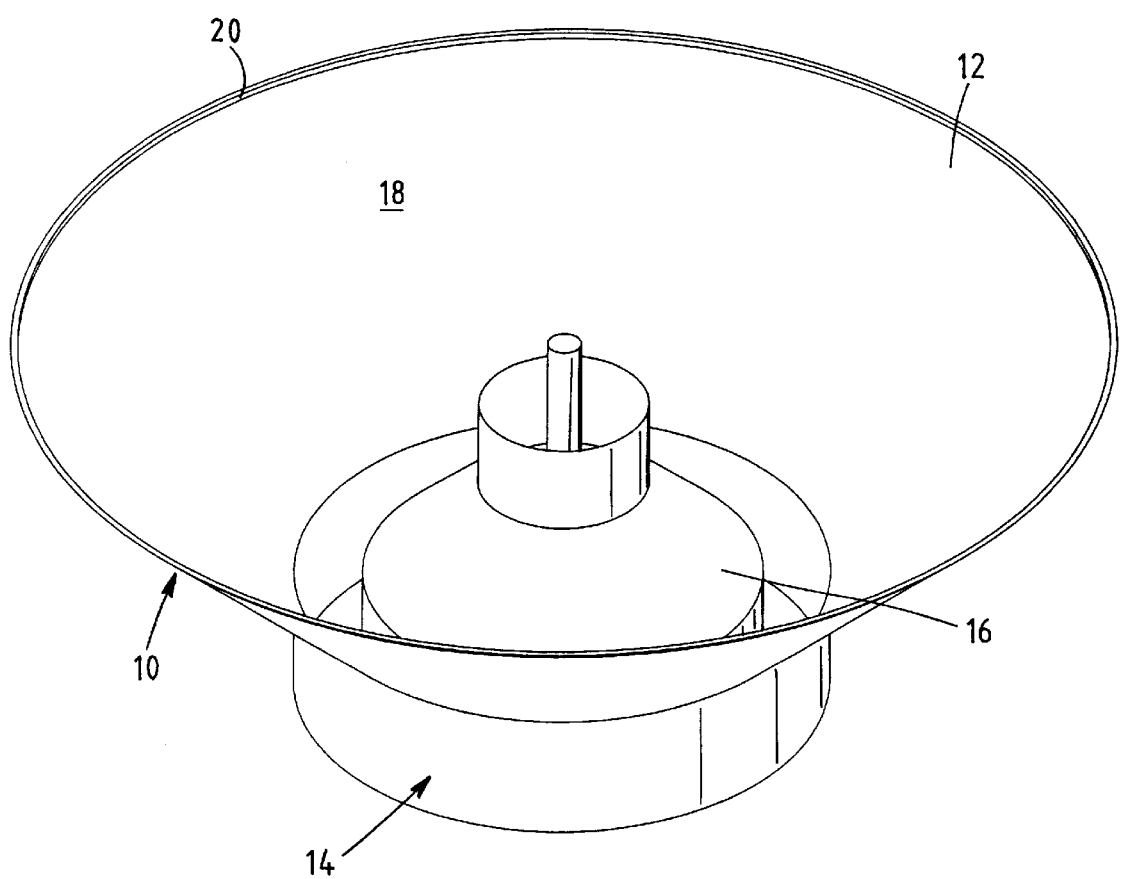
FIG. 1 is a perspective view of the shell of a water clarifier in accordance with the present invention.

FIG. 1 shows one embodiment of a shell 10 for an upflow clarifier in which a liquid, in this case water, is clarified. The illustrated shell may be used for clarifying water for industrial use, for clarifying drinking water, or for clarifying wastewater. The shell has an outer wall 12 in the form of a frustum of a cone that extends upwardly and outwardly from a lower chamber 14, which forms the base of the shell. The shell also has an inner wall 16 that extends upwardly and inwardly from the lower chamber. Collectively, the outer wall 12 and the inner wall 16 define a main chamber 18 of the clarifier.

Figure 2:
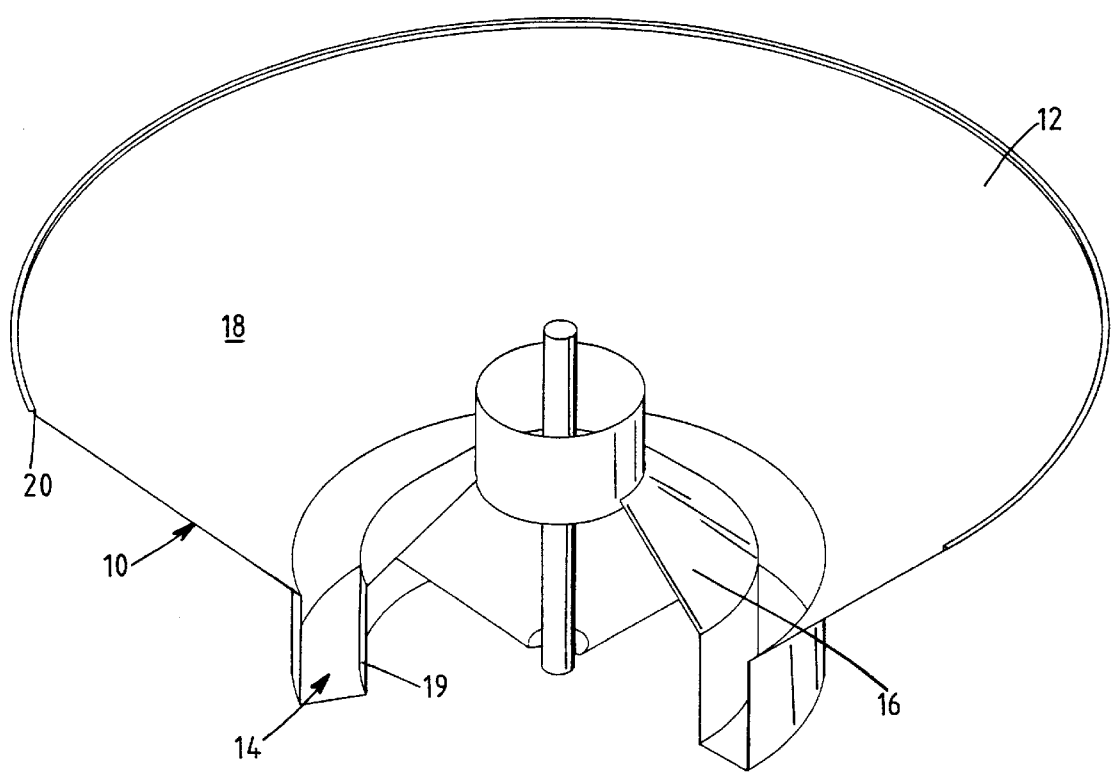
FIG. 2 is a broken-away view of the shell of FIG. 1.

As best seen in FIG. 2, the lower chamber 14 is annular with an interior region defined by an inside wall 19. Preferably, the lower chamber takes the form of a hollow annular cylinder, but other geometries, including one in which the outer wall is a conical section that is continuous with the outer wall 12 and may be truncated, may also be useful.

As illustrated, the shell 10 has a short upper rim 20. Alternatively, the upper rim could be eliminated or could take other forms, such as a longer cylindrical section or an inwardly-projecting cone or frustum.

Figure 3:
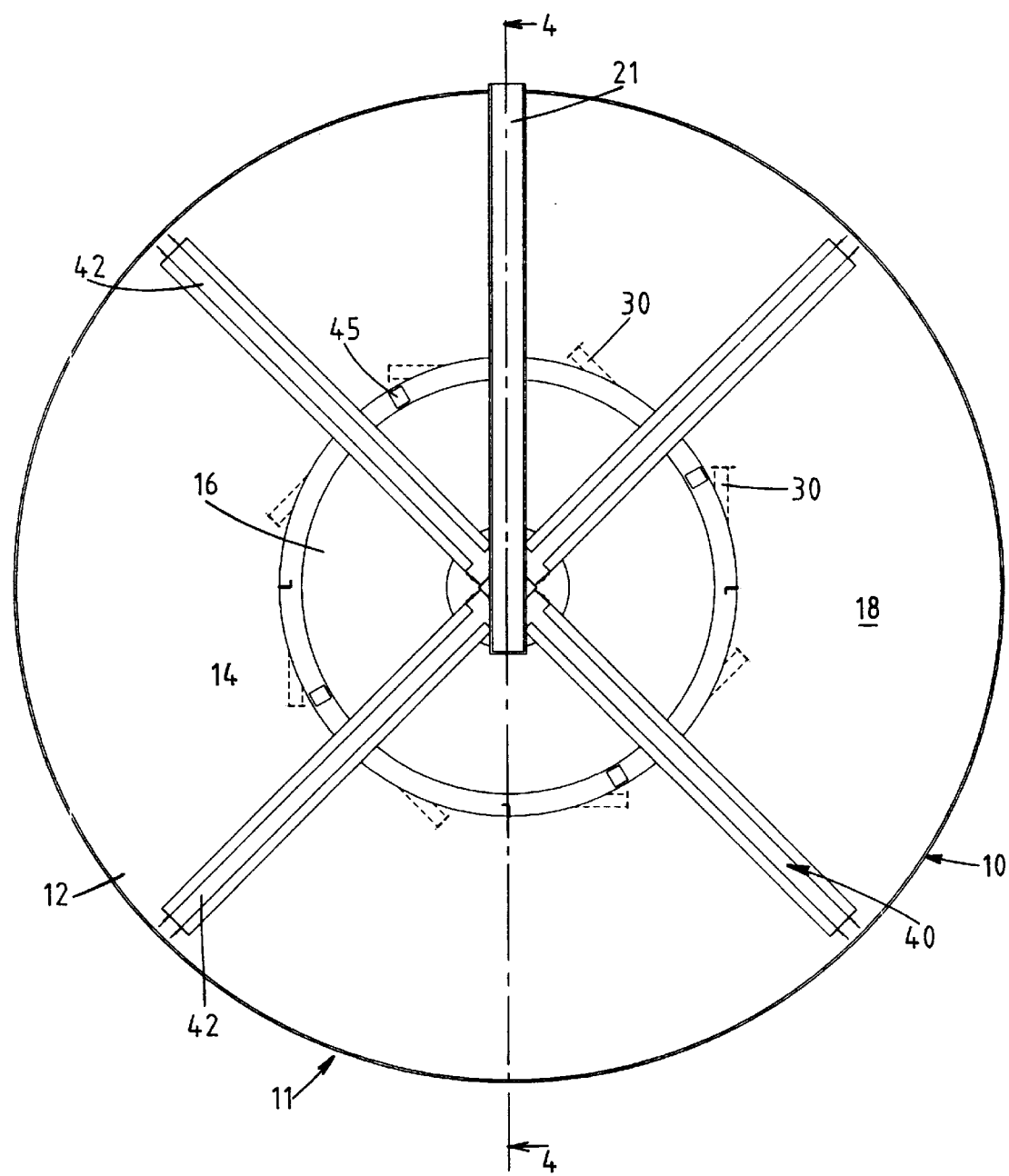
FIG. 3 is a top view of a clarifier employing the shell of FIG. 1.
Figure 4:
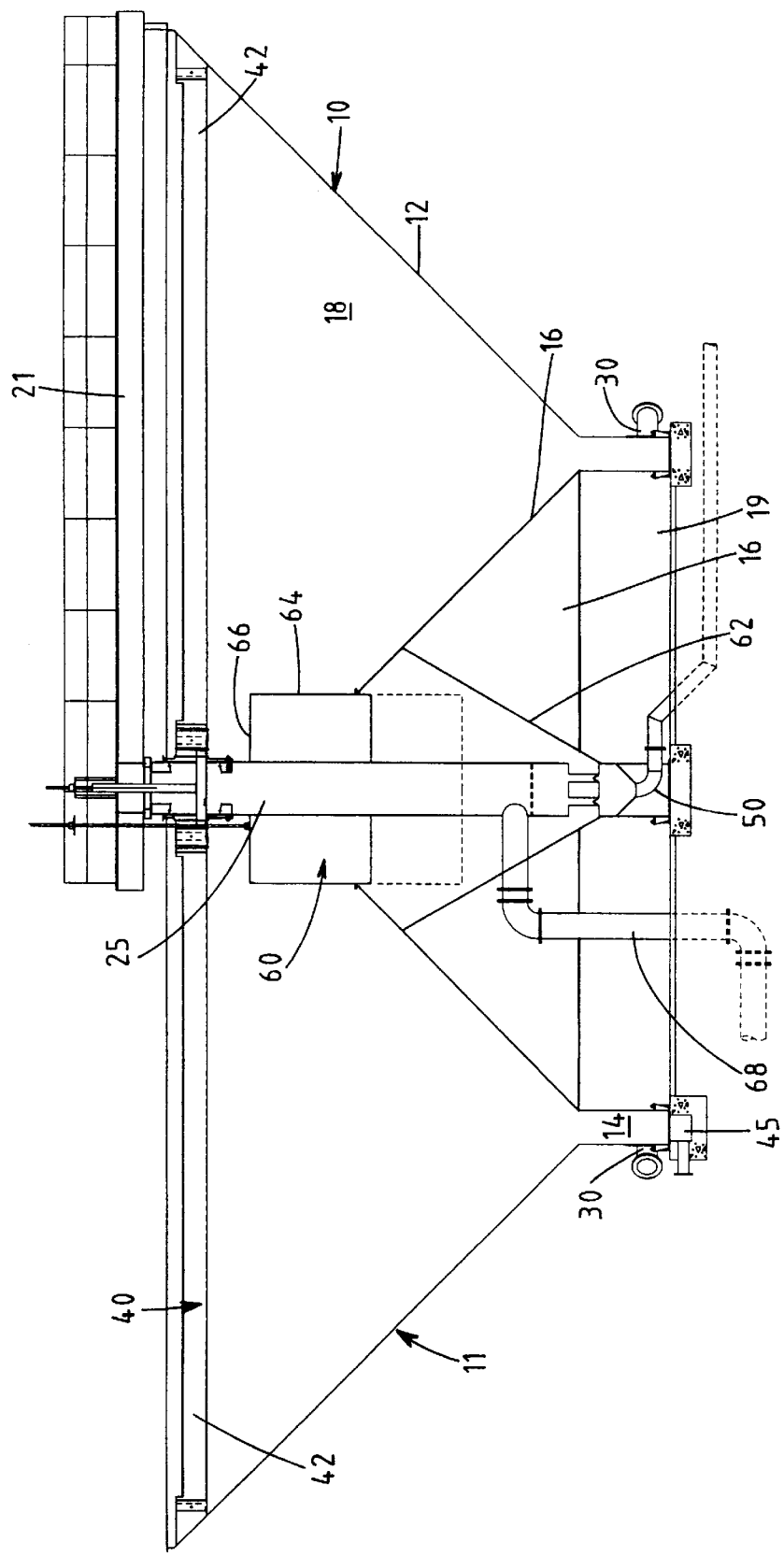
FIG. 4 is a cross-sectional side view of the clarifier of FIG. 3, taken along line 4—4 of FIG. 3.

As illustrated in FIGS. 3 and 4, an access and observation deck 21 can be used to span a portion of the main chamber 18 of the shell 10 to enable an operator to make a visual inspection of the water being clarified and to operate equipment. At least a part of the weight of such a deck can be supported by a central pier 25 (FIG. 4) extending through the interior region of the lower chamber 14 and through the main chamber 18 of the clarifier.

Inlets 30 (seen in FIGS. 3 and 4) allow untreated liquid to be fed to the lower chamber 14 of a clarifier 11. When in use, clarified effluent is withdrawn from the clarifier through an outlet 40 (FIG. 4) in the main chamber 18. As is conventionally known, positioning the inlets tangentially to the lower chamber and removing liquid from the top of the main chamber develops an upward helical flow in the liquid in the clarifier. Vanes (not shown) could also be used to develop or maintain a helical flow, and it is not necessary to provide multiple inlets as shown here.

As illustrated, one or more grit collection chambers 45 are disposed at the bottom of the annular lower chamber 14. These chambers allow periodic removal of dense particles that accumulate in the bottom of the lower chamber.

One or more chemical inlets for introducing water treatment chemicals, such as precipitating, coagulating, and/or flocculating agents, can also be provided in either the lower chamber 14 or the main chamber 18.

As water (or other liquid) in the clarifier 11 rises in a helical path through the lower chamber 14 and subsequently through the main chamber 18, it spreads to fill the increasing cross-sectional area of the main chamber. This spreading results in a corresponding decrease in the velocity of the water, while the net flow rate remains constant. The velocity of the water continues to decrease as it moves upwardly and a point is reached where the lifting force of the water and the counteracting gravitational force on solids suspended in the water are in equilibrium. At that point, the lifting force of the water is not great enough to lift the suspended solids any higher in the clarifier, and the solids tend to accumulate in what becomes a suspended sludge blanket rotating in a portion of the main chamber.

As solids accumulate in a sludge blanket, water continues to flow upwardly through the blanket. This continuing upward movement results in a layer of clarified water in the main chamber 18 of the clarifier 11 above the sludge blanket.

The clarifier 11 illustrated in FIGS. 3 and 4 is about 33 feet tall and has an overall diameter of about 100 feet. The lower chamber 14 is about 6 feet tall and about 2 feet across, surrounding an interior region that has a diameter of about 40 feet and a planar cross-sectional area of about 1250 square feet. The angles of the outer wall 12 and the inner wall 16 of the clarifier 11 result in the main chamber 18 having a cross-sectional area of about 265 square feet at its lowermost point (adjacent the lower chamber 14) and a cross-sectional area of about 7500 square feet at the height of the outlet 40. These sizes could be modified.

In order to assure that the vessel is economical, it is generally preferable that the inner wall 16 and the outer wall 12 of the main chamber 14 be angled no less than about 60 degrees with respect to each other. In order to assure that sludge blanket particles do not settle and accumulate on the outer wall 12 or on the inner wall 16, it is also generally preferable that the angle of each wall be at least about 40 degrees with respect to the horizontal. Preferably, the cross-sectional area of the main chamber near the outlet 40 is about ten to forty times the cross-sectional area of the bottom of the main chamber.

As illustrated in FIG. 4, the outlet 40 for withdrawing effluent from the clarifier 11 can take the form of one or more radial weir troughs 42 that are at least partially supported by the central pier 25 (FIG. 3). Partially supporting such troughs from a central pier reduces the support requirements of the observation deck from which such troughs are otherwise commonly suspended. The outlet 40 can of course be arranged in other ways. For example, conventional radial weirs, peripheral weirs, or circular collection troughs can also be used.

In many conventional upflow clarifiers, effluent is collected through external drop boxes or the like that are connected by peripheral pipes. That method of effluent collection can also be used with this invention. Alternatively, as illustrated in FIG. 4, the radial weir trough 42 can be connected to an effluent withdrawal line 50 that extends through the central pier 25. Because the clarifier of FIG. 4 collects effluent at a central location, it requires less piping than conventional arrangements, and thus can offer a savings in installation, painting, and maintenance costs. Routing the effluent through a central location also provides superior thermal insolation for the withdrawn effluent, reducing the risk of freezing in cold-weather areas.

Of course, the effluent withdrawal line 50 need not extend through the interior of the central pier 25 to achieve these benefits. It can, for example, simply run along-side the central pier. Further, benefits of the invention can be obtained even if the effluent is not withdrawn from a central location.

In upflow clarifiers, it is periodically necessary to remove sludge from the sludge blanket. Conventional upflow clarifiers typically utilize conical sludge concentrators to provide a volume in which sludge is concentrated or thickened before being discharged. The use of a larger sludge storage volume allows the use of smaller and less expensive thickeners, lagoons, and/or dewatering equipment to handle the waste sludge removed from the clarifier. In the present invention, sludge can be withdrawn through a sludge removal structure 60 on the central pier 25. The sludge removal structure can take many different forms.

As illustrated in FIG. 4, the sludge removal structure 60 takes the form of a hopper 62 that surrounds the central pier 25. Nested within an upper rim of the hopper is an open-topped and open-bottomed adjustable cylinder 64. Sludge that rises above an upper edge 66 of the cylinder slips into the hopper, where it can be thickened before being discharged through a sludge discharge line 68. The adjustable cylinder 64 can be moved vertically by jacks or the like, so that the upper edge 66 of the cylinder can be selectively positioned at different depths in the main chamber 18 of the clarifier 11. In this way, the height of the top of a sludge blanket in the clarifier can be adjusted by raising or lowering the height of the upper edge of the cylinder.

The sludge storage volume of the sludge removal structure 60 can be significantly greater than that provided by the sludge concentrator typically provided in conventional upflow clarifiers. As illustrated, the hopper extends to a portion of the inner wall. Alternatively, it could be expanded to include the entire interior region.

Figure 5:
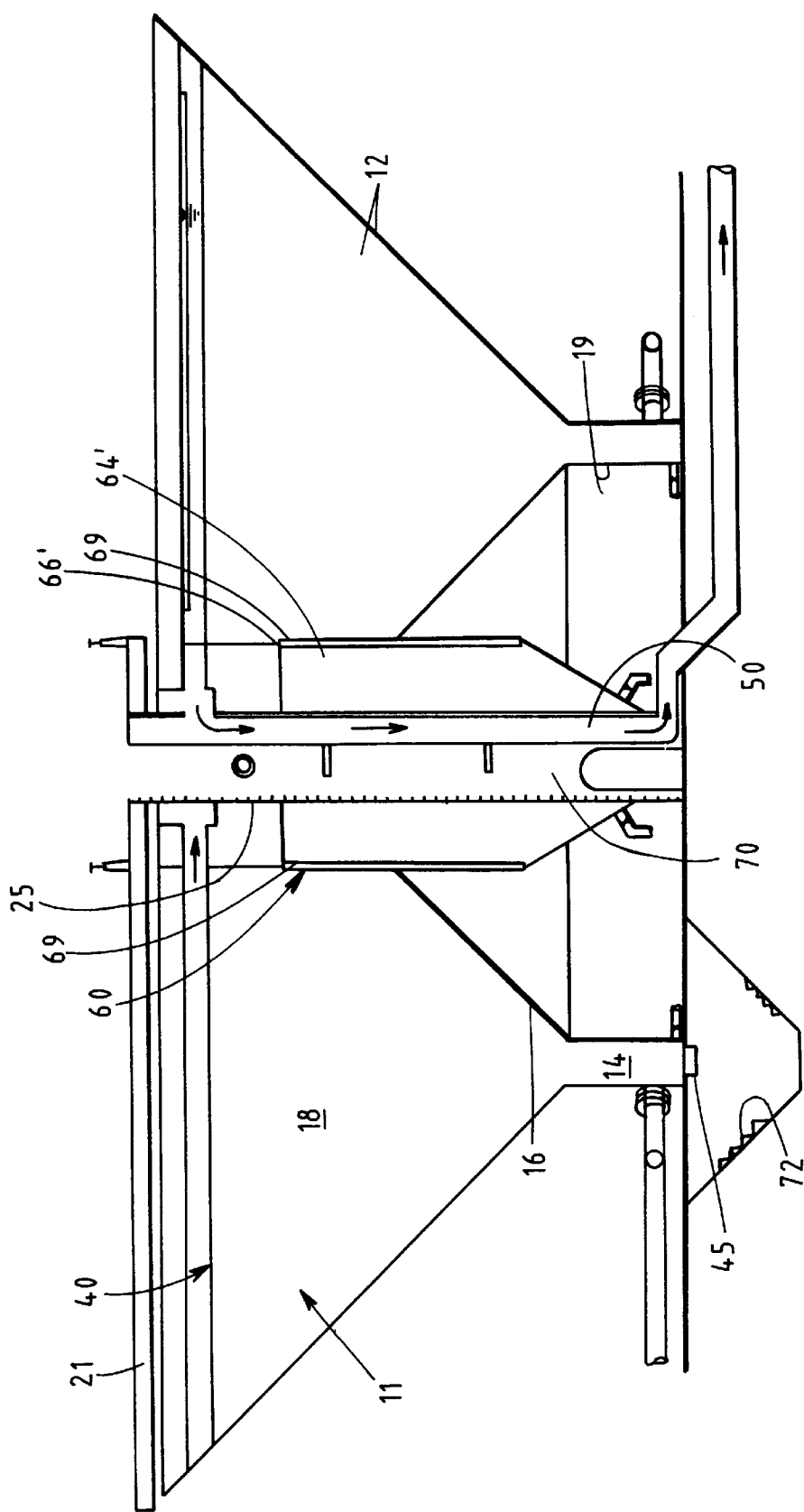
FIG. 5 is a cross-sectional side view of an alternative embodiment of a clarifier in accordance with the present invention.

An alternative type of sludge removal structure 60 is illustrated in FIG. 5. In this embodiment of the invention, the adjustable cylinder 64 of FIG. 4 has been replaced by a non-adjustable cylinder 64'. A pair of adjustable gates 69 are provided on each side of the non-adjustable cylinder 64'. The gates have upper edges 66' that are used to control the height of the sludge blanket.

FIG. 5 also illustrates one of many ways in which the interior volume of the central pier 25 can be divided into both an effluent withdrawal line 50' and a manway 70 in the form of a shaft for access to the interior region of the annular lower chamber 14. Alternatively, access to the interior region can be provided by a walkway 72 under a section of the lower chamber 14. Access can be useful for many reasons, including, for example, obtaining access to the grit collection chambers 45.

When a clarifier is built in an excavated site, some of the excavated material can be backfilled within the interior region to support the inside wall 19 and/or inner wall 16.

Figure 6:
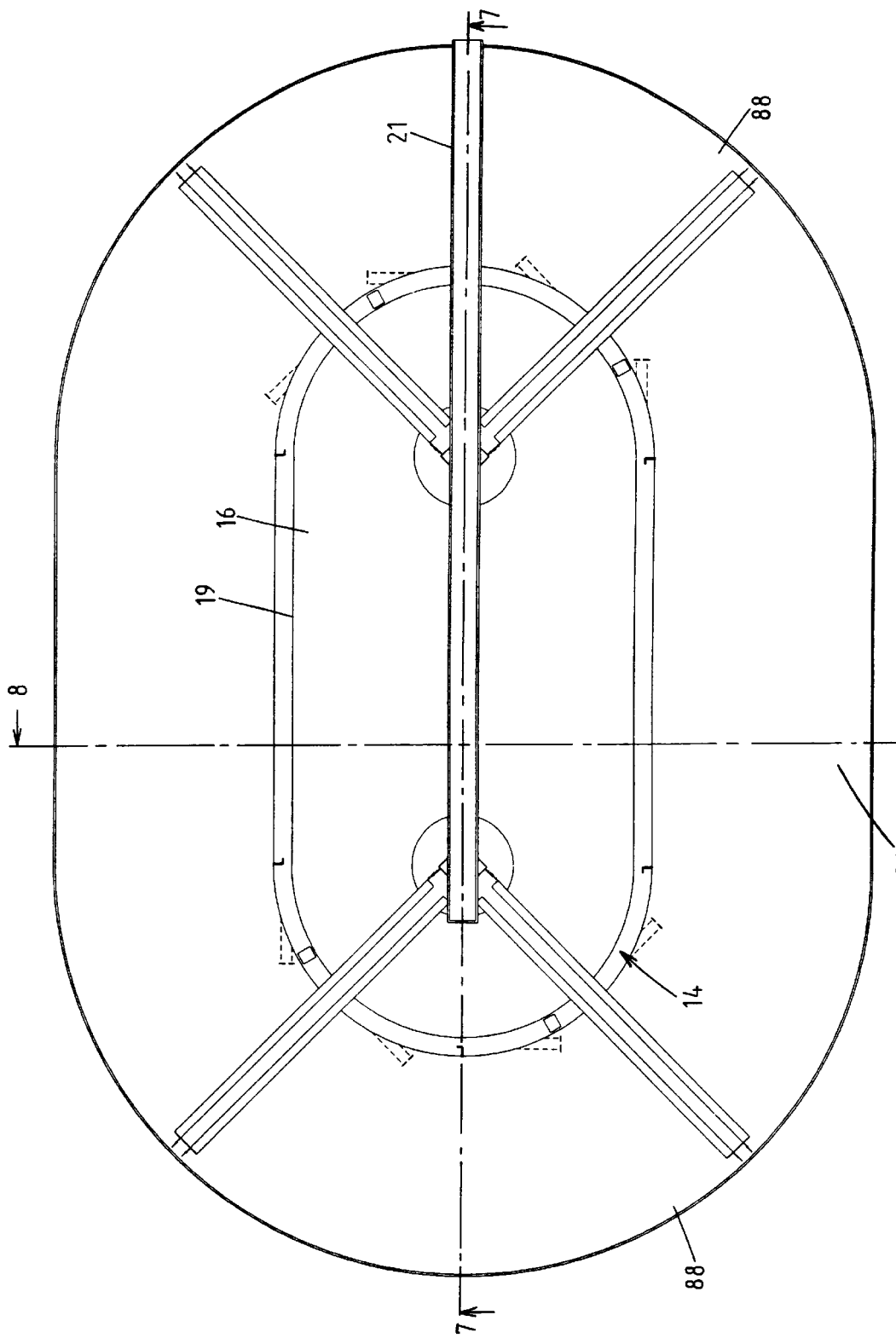
FIG. 6 is a top view of still another embodiment of a clarifier in accordance with the present invention.
Figure 7:
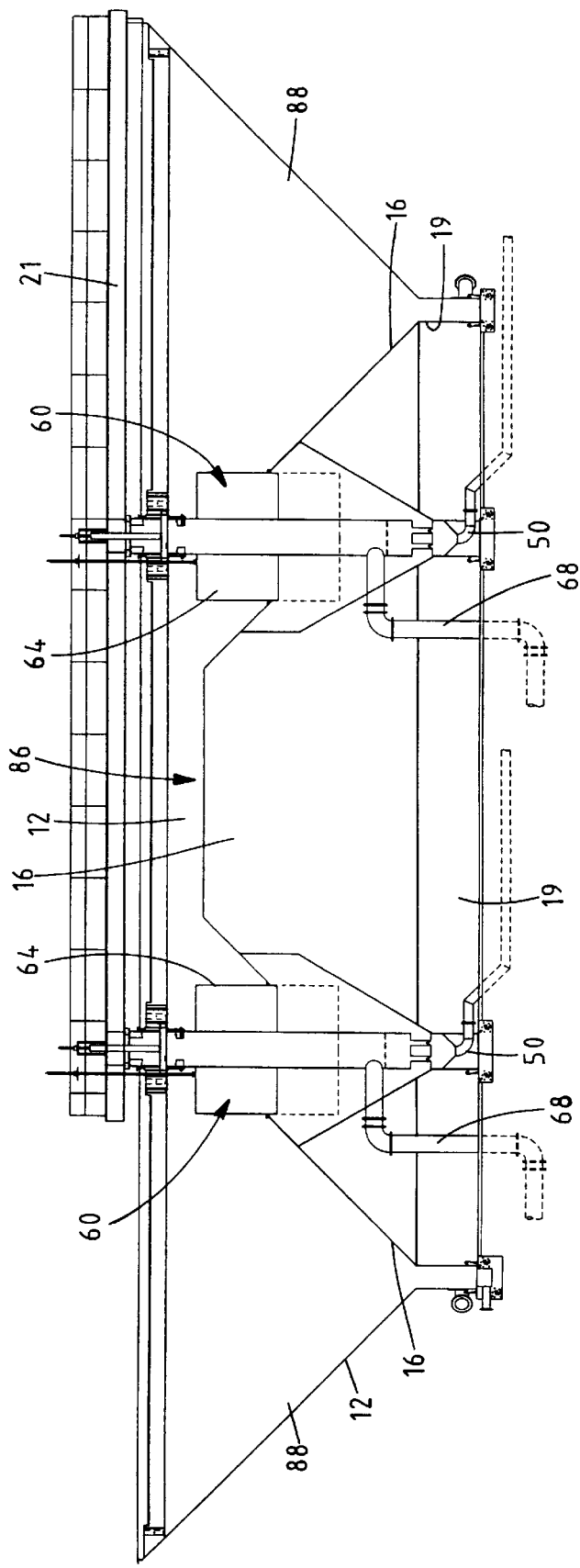
FIG. 7 is a cross-sectional side view of the clarifier of FIG. 6, taken along line 7—7 of FIG. 6.
Figure 8:
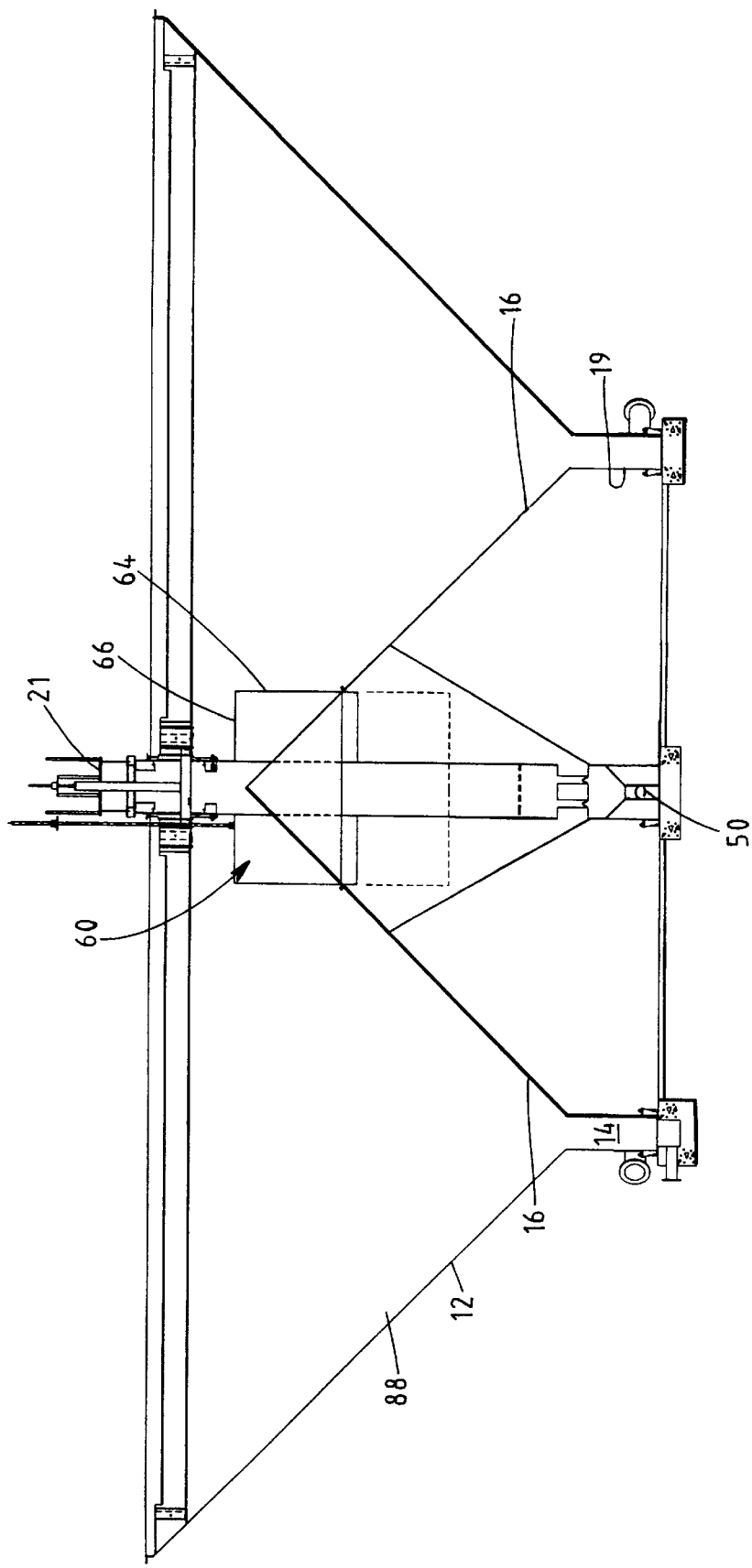
FIG. 8 is a cross-sectional side view of the clarifier of FIG. 6, taken along line 8—8 of FIG. 6.

FIGS. 6, 7, and 8 illustrate a modular design for a clarifier that includes a straight section 86 extending between a pair of semi-circular curved sections 88. The clarifier also has two separate sludge removal structures 60, one positioned at each end of the straight section. The clarifier could be provided with only a single sludge removal structure. Alternatively, the two separate sludge removal structures could be extended and connected to provide one large, elongated sludge collection structure. Other configurations are also possible.

The modular approach incorporated into this design allows flexibility in the design of clarifiers with different capacities with minimal design changes. For example, the clarifier illustrated in FIGS. 6–8 uses the same shell components as the clarifier illustrated in FIG. 4, and may have a treatment capacity of about 7,500 gpm. In the clarifier illustrated in FIGS. 6–8, the shell has been cut in half and the resulting two semi-circular curved sections 88 have been separated by a straight section 86 that is 50 feet long. The treatment capacity of this new, larger clarifier may be about 12,400 gpm, and can be built without the need to plan or order materials for curved sections of a different size than those used for the smaller-capacity clarifier shown in FIG. 4. Alternatively, the shell could be cut into three or more pieces that are joined by straight sections (or even curved sections), resulting in a triangular, square, pentagonal, etc. shape with rounded corners, or an oval. In some cases, the straight sections need not have the same length, resulting in, for example, a rectangular shape with rounded corners.

This detailed description has been given only for clearness of understanding. As many modifications will be obvious to those skilled in the art, no unnecessary limitations should be understood from this description. Instead, to determine the scope of the invention, reference should be made to the following claims.

What is claimed is:

1. A clarifier for treating a liquid containing dissolved or suspended solids, the clarifier comprising:
    an annular lower chamber;
    an outer wall extending upwardly and outwardly from the lower chamber;
    a sludge removal structure;
    a n inner wall extending upwardly and inwardly from the lower chamber;
    at least one inlet directly entering the lower chamber; and
    means for withdrawing clarified liquid from near the top of the clarifier.

2. The clarifier of claim 1, in which the lower chamber is cylindrical.

3. The clarifier of claim 1, in which the clarifier has two curved sections separated by a straight section.

4. The clarifier of claim 1, in which the lower chamber has a cylindrical inside wall and the planar cross-sectional area within the inside wall is at least about one-tenth the planar cross-sectional area of the lower chamber.

5. A clarifier as recited in claim 1, in which the effluent collection means comprises at least one radial trough extending radially from above the inner wall to near the outer wall and being partially supported by a central pier.

6. A clarifier as recited in claim 1, in which
    the lower chamber has an inside wall that, with the inner wall, defines an interior region; and
    the effluent collection means comprises an effluent discharge pipe that is at least partially disposed within the interior region.

7. A clarifier as recited in claim 1, in which:
    the lower chamber has an inside wall that, with the inner wall, defines an interior region; and
    the clarifier further comprises a tunnel means for providing personnel with access to the interior region.

8. A clarifier as recited in claim 1, and further comprising a central pier, the central pier comprising both an effluent discharge pipe that extends downwardly through the pier and a tunnel for providing personnel with access to an interior region defined by the inner wall and an inside wall on the lower chamber.

9. A clarifier as recited in claim 1, in which:
    the sludge collection site is at least partially within an interior region defined by the inner wall and an inside wall on the lower chamber; and
    the clarifier further comprises a central pier extending through the sludge removal structure, the central pier comprising an effluent discharge pipe that extends downwardly through the pier and a tunnel means for providing personnel with access to the interior region.

10. A clarifier as recited in claim 1, and further comprising a shaft means passing through an interior of the inner wall for providing personnel with access to an interior region defined by an inside wall on the lower chamber.

11. A clarifier as recited in claim 1, in which the sludge removal structure comprises a sludge collection site disposed within the inner wall.

12. A clarifier as recited in claim 1, in which the lower chamber is disposed in an excavated area, and the inner wall is supported by material removed from the excavated area during excavation.

13. A clarifier as recited in claim 1, in which the lower chamber is disposed in an excavated area, and the inner wall is supported by material removed from the excavated area during excavation.

14. A clarifier for treating a liquid containing dissolved or suspended solids, the clarifier comprising:
    an annular lower chamber with an inside wall;
    an inner wall extending upwardly and inwardly from the lower chamber;
    an outer wall extending upwardly and outwardly from the lower chamber;
    at least one inlet in liquid communication with the lower chamber;
    means for withdrawing clarified liquid from near the top of the clarifier;
    an interior region defined by the inside wall and the inner wall;

a sludge removal structure at least partially disposed within the interior region; and means for raising or lowering an edge on the sludge removal structure as part of a means for controlling a sludge level in the clarifier.

15. A clarifier for treating a liquid containing dissolved or suspended solids, the clarifier comprising:

an annular lower chamber with an outside wall;

an inner wall extending upwardly and inwardly from the lower chamber;

an outer wall extending upwardly and outwardly from the outside wall of the lower chamber;

a sludge removal structure;

at least one inlet on the outside wall directly entering the lower chamber; and means for withdrawing clarified liquid from near the top of the clarifier.

* * * * *

UNITED STATES PATENT AND TRADEMARK OFFICE
CERTIFICATE OF CORRECTION

PATENT NO. : 6,092,671
DATED : July 25, 2000
INVENTOR(S) : Donald N. Ruehrwein et al.

It is certified that error appears in the above-identified patent and that said Letters Patent is hereby corrected as shown below:

Column 5,
Line 63, delete the space between "a" and "n" in the word "an"

Signed and Sealed this

Seventh Day of June, 2005

JON W. DUDAS
*Director of the United States Patent and Trademark Office*